United States Patent
Li et al.

(10) Patent No.: US 10,819,197 B1
(45) Date of Patent: Oct. 27, 2020

(54) CONSTANT DUTY RATIO HIGH FREQUENCY VOLTAGE INJECTION-BASED RESOLVER OFFSET DETECTION

(71) Applicant: Ford Global Technologies, LLC, Dearborn, MI (US)

(72) Inventors: Silong Li, Canton, MI (US); Jiyao Wang, Canton, MI (US); Wei Xu, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/386,017

(22) Filed: Apr. 16, 2019

(51) Int. Cl.
G05B 1/06 (2006.01)
H02K 15/00 (2006.01)
H02P 21/34 (2016.01)
H02P 6/18 (2016.01)

(52) U.S. Cl.
CPC ......... H02K 15/0006 (2013.01); H02P 6/183 (2013.01); H02P 21/34 (2016.02)

(58) Field of Classification Search
CPC .................................................... H02P 29/032
See application file for complete search history.

(56) References Cited

U.S. PATENT DOCUMENTS

| 5,808,452 A * | 9/1998 | Gyugyi | H02J 3/1814 323/207 |
|---|---|---|---|
| 6,429,616 B1 | 8/2002 | Myers et al. | |
| 9,190,889 B2 | 11/2015 | Savio et al. | |
| 2015/0100264 A1 | 4/2015 | Qian | |
| 2018/0323714 A1* | 11/2018 | Johnson | H02M 1/08 |

* cited by examiner

*Primary Examiner* — Karen Masih
(74) *Attorney, Agent, or Firm* — David B. Kelley; Brooks Kushman P.C.

(57) ABSTRACT

A vehicle power system includes an electric machine, an inverter electrically connected with the electric machine, and a controller. The controller, while injecting AC voltage output by the inverter into the electric machine as a DC voltage input to the inverter changes, drives a duty ratio of the inverter toward a constant value to obtain resolver offset information associated with the electric machine from a current response of the electric machine to the AC voltage.

16 Claims, 4 Drawing Sheets

CONSTANT DUTY RATIO HIGH FREQUENCY VOLTAGE INJECTION-BASED RESOLVER OFFSET DETECTION

TECHNICAL FIELD

This disclosure relates to electric machine operation.

BACKGROUND

Resolver offset detection operations detect resolver offset of an electric machine regardless of the influence of inverter deadtime. If the estimated resolver offset is incorrect, the torque accuracy of the electric machine and its control algorithms can be degraded. Moreover, if the resolver offset error is large, it can result in torque reversal.

Some high frequency voltage injection-based resolver offset detection methods detect resolver offset using a fixed injected voltage amplitude. The accuracy of these techniques, however, is influenced by inverter deadtime/inverter nonlinearity, which cannot be avoided. The accuracy is also not consistent under different DC-bus voltages or battery voltages, since deadtime voltages are influenced by the DC-bus voltage or battery voltage.

SUMMARY

A vehicle power system includes a DC bus, an electric machine, and an inverter electrically between the DC bus and electric machine. The vehicle power system also includes a controller that injects AC voltage into the electric machine via the inverter, and responsive to changes in DC voltage of the DC bus, alters a magnitude of the AC voltage to drive a ratio of the DC voltage to the magnitude toward a constant value as the DC voltage changes.

A vehicle power system includes an electric machine, an inverter, and a controller. The controller, while injecting AC voltage output by the inverter into the electric machine as a DC voltage input to the inverter changes, drives a duty ratio of the inverter toward a constant value to obtain resolver offset information associated with the electric machine from a current response of the electric machine to the AC voltage.

A method for controlling a vehicle power system includes injecting by a controller AC voltage into an electric machine via an inverter, and responsive to changes in DC voltage input to the inverter during the injecting, altering by the controller a magnitude of the AC voltage to drive a ratio of the DC voltage to the magnitude toward a constant value to obtain resolver offset information about the electric machine.

DETAILED DESCRIPTION

Figure 1:
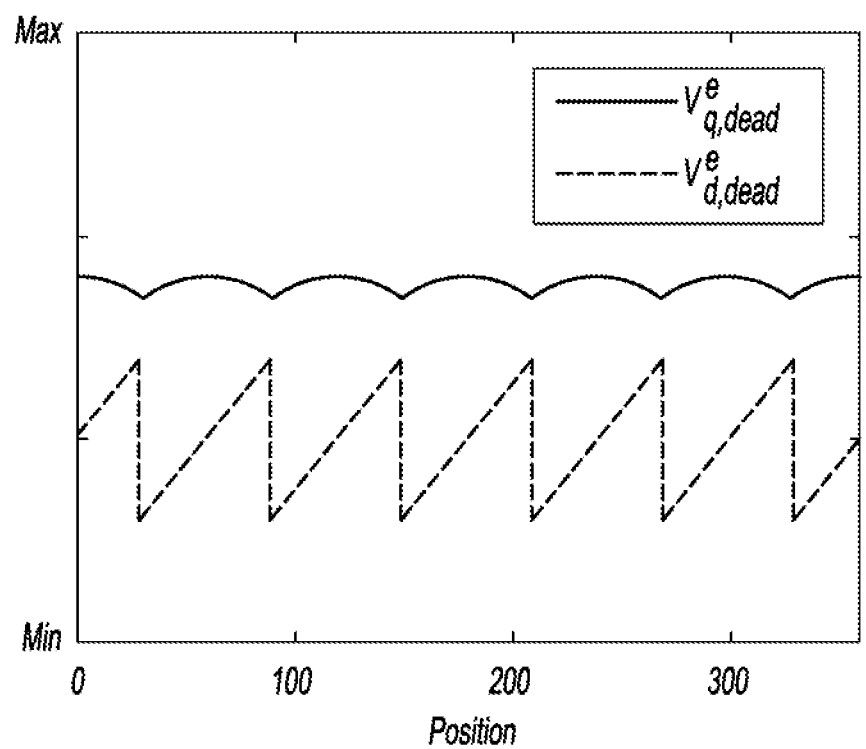
FIG. 1 is a d-axis/q-axis plot of deadtime voltage as a function of angular position for a given DC-bus voltage.

Various embodiments of the present disclosure are described herein. However, the disclosed embodiments are merely exemplary and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent with the teachings of this disclosure may be desired for particular applications or implementations.

This disclosure proposes constant duty ratio high frequency voltage injection-based resolver offset detection methods to mitigate inverter deadtime effects. The amplitude of injected high frequency voltage is no longer a fixed value. Rather, it varies with the DC-bus voltage or battery voltage to maintain a relatively constant controller duty ratio output, which can improve resolver offset detection accuracy under all DC-bus voltage conditions and promote detection consistency.

Resolver offset detection is implemented by introducing a high frequency voltage signal into the electric machine. For this high frequency voltage signal and with reference to Eq. (1), a persistent rotating high frequency voltage vector, $V_{dqs}^{s}$, in the stationary reference frame is injected into the electric machine:

$$V_{dqs}^{s} = V_c e^{j\omega_c t} \tag{1}$$

where $V_c$ represents the amplitude of the rotating voltage vector, and $\omega_c$ represents the frequency of the rotating voltage vector. The three-phase currents from the electric machine response are then observed and post-processed for rotor position detection. The detected rotor position is then compared with a resolver reading to determine the resolver offset value accordingly.

The injection frequency is chosen based on the inverter switching frequency. A ratio of approximately 10 to 20 between the switching frequency and injection frequency are example optimized values. The selection of amplitude $V_c$ is described later.

The high frequency current response, $I_{dqs}^{S}$, has the saliency information embedded therein and can be represented by Eq. (2):

$$I_{dqs}^{s} = I_{cp} e^{j(\omega_c t + \varphi_{cp})} + I_{cn} e^{j(\omega_c t + \varphi_{cn})} \tag{2}$$

where $I_{cp}$ and $I_{cn}$ represent the magnitude of the positive and negative sequence current response respectively, and $\varphi_{cp}$ and $\varphi_{cn}$ represent the phase of the positive and negative sequence current response respectively.

The phase the of negative sequence current response, $\varphi_{cn}$, is represented by Eq. (3):

$$\varphi_{cn} = 2\theta_e - \frac{\pi}{2} \tag{3}$$

where $\theta_c$ is the rotor position in electric degrees. It includes the electric machine rotor position information, and as consequence can be used for rotor position and resolver offset detection.

With reference to Eq. (4), the phase of the negative sequence current response, $X_k$, can be estimated by applying the discrete Fourier transform (DFT) to the three-phase current:

$$X_k = X_k = \sum_{n=0}^{N-1} x_n e^{-j2\pi f_c T_s} \quad (4)$$

where N is the number of samples of the discrete Fourier transform (the more samples taken, the more accurate the DFT results; more samples, however, require more calculation time that can delay the detection), $x_n$ is the sampled high frequency current complex vector, $I_{qds}$, and $f_c$ is the frequency of the injected signal (for the positive sequence, the sign is positive; for the negative sequence, the sign is negative).

In real applications, deadtime and nonlinearity exist in inverter systems. Inverter deadtime, $V_{dead}$, will lead to errors in actual output voltage of the inverter. As a consequence, the injected high frequency voltage signal is not as expected and will lead to resolver offset detection error. The inverter nonlinearity effect is shown in Eqs. (5) and (6):

$$V_{dead} = \frac{T_{dead} + T_{on} - T_{off}}{T_s} \cdot (V_{dc} - V_{sat} + V_d) + \frac{V_{sat} + V_d}{2} \quad (5)$$

where $T_{dead}$, $T_{on}$, $T_{off}$, and $T_s$ represent the deadtime, turn-on delay time, turn-off delay time, and pulse width modulation period, respectively, $V_{dc}$ is the DC-bus voltage, $V_{sat}$ is the on-state voltage drop of the switch, and $V_d$ is the forward voltage drop of the diode.

$$\begin{bmatrix} V_{d,dead}^e \\ V_{q,dead}^e \end{bmatrix} = V_{dead} \cdot \frac{2}{3} \begin{bmatrix} \cos(\theta_e) & \cos(\theta_e - \frac{2\pi}{3}) & \cos(\theta_e + \frac{2\pi}{3}) \\ \sin(\theta_e) & \sin(\theta_e - \frac{2\pi}{3}) & \sin(\theta_e + \frac{2\pi}{3}) \end{bmatrix} \begin{bmatrix} \text{sign}(i_a) \\ \text{sign}(i_b) \\ \text{sign}(i_c) \end{bmatrix} \quad (6)$$

where $V_{d,dead}^e$ and $V_{q,dead}^e$ respectively represent the d-axis and q-axis deadtime voltage in the synchronous reference frame, and $i_a$, $i_b$, and $i_c$ respectively represent the phase-A, phase-B, and phase-C current. Among all factors, the inverter deadtime is typically the dominant factor.

FIG. 1 shows the deadtime voltage on the d-axis and q-axis of the synchronous reference frame as a function of angular position at one particular DC-bus voltage. The inverter deadtime has different influence on the d-axis as compared with the q-axis, and shows a six order pattern in one electric cycle.

Figure 2:
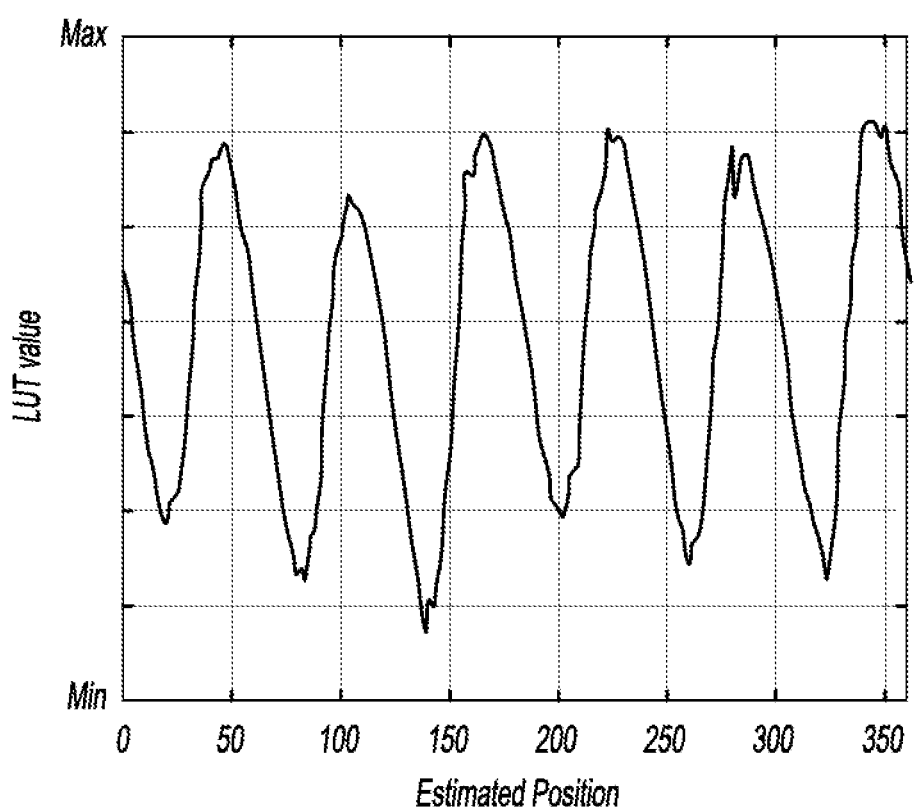
FIG. 2 is a plot of an example look-up table for resolver offset detection.

To compensate for the influence of the inverter deadtime and improve resolver offset detection accuracy, a look-up table can be utilized to compensate for the error. FIG. 2 shows an example of such look-up table resolver offset detection. Using the look-up table, the accuracy of the resolver offset detection is achieved for one particular DC-bus or battery voltage. The deadtime voltage, however, is also a function of the DC-bus voltage, so additional action is needed to improve resolver offset detection accuracy at various DC-bus voltages.

To achieve this, it is proposed to use a constant duty ratio. When the DC-bus voltage changes from $V_{dc1}$ to $V_{dc2}$, the algorithm also changes the magnitude of the injected high frequency voltage signal from $V_{c1}$ to $V_{c2}$ to keep the duty ratio constant, as shown in Eq. (7):

$$\frac{V_{dc1}}{V_{c1}} = \frac{V_{dc2}}{V_{c2}} \quad (7)$$

In such a manner, the phase lag of actual high frequency voltage output signals is fixed regardless of DC-bus voltage variation, and the look-up table mentioned above is able to compensate for the inverter deadtime effect under varying DC-bus voltage conditions.

Figure 3:
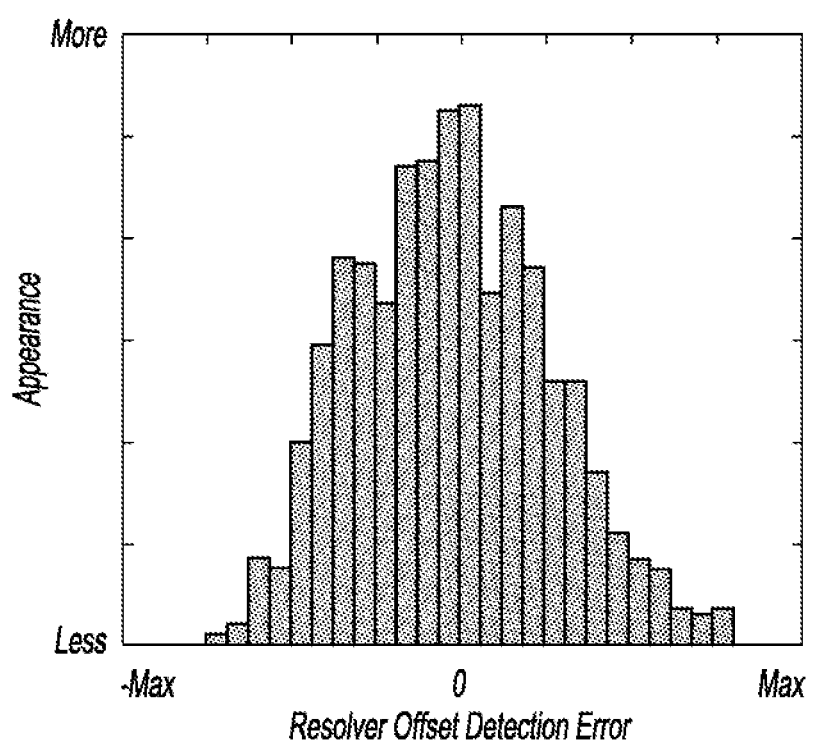
FIG. 3 is an example of repeated resolver offset detection results under various rotor positions and DC-bus voltages.

FIG. 3 shows an example of repeated resolver offset detection results under various rotor positions and DC-bus voltages (200V variation). All results show small resolver offset detection error.

Figure 4:
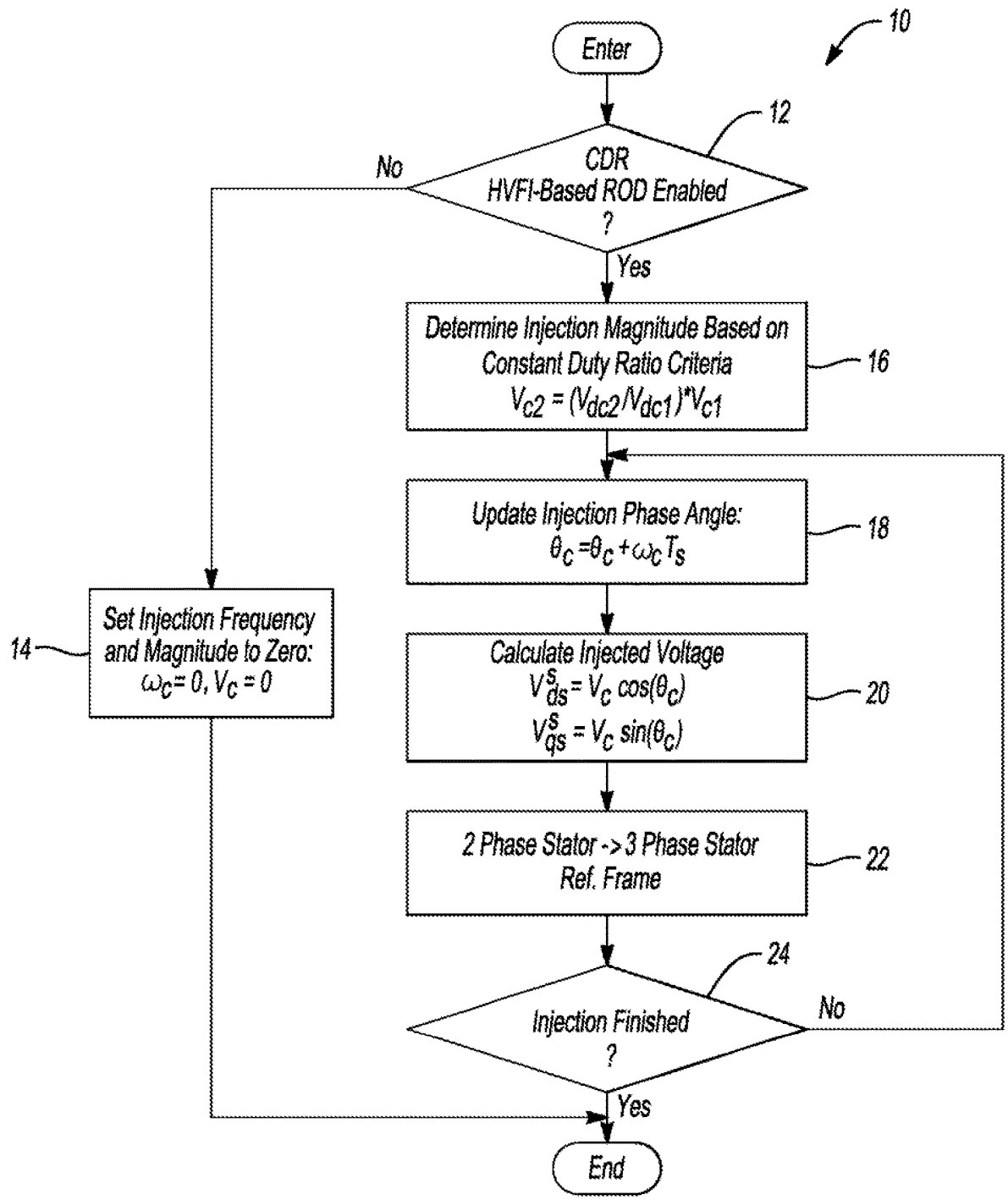
FIG. 4 is a flow chart of an injection routine

FIG. 4 shows an algorithm 10 for an injection routine associated with the techniques proposed herein. At operation 14, it is determined whether constant duty ratio high frequency voltage injection-based resolver offset detection is enabled. If no, the injection frequency, $\omega_c$, and magnitude $V_c$, are set to zero at operation 14. The algorithm 10 then ends. If yes, the adjusted injection magnitude, $V_{c2}$, is determined according to the relation shown (see also Eq. (7)). At operation 18, the injection angle $\theta_c$ is updated according to the relation shown, where $T_s$ is the sampling period. The injection voltage, $V_{ds}^s$, $V_{qs}^s$, is then calculated at operation 20 according to the relation shown. At operation 22, the two-phase stator reference frame is transformed to the three-phase stator reference frame using standard techniques. And at operation 24, it is determined whether the injection is finished. If no, the algorithm 10 returns to operation 18. If yes, the algorithm 10 ends.

Figure 5:
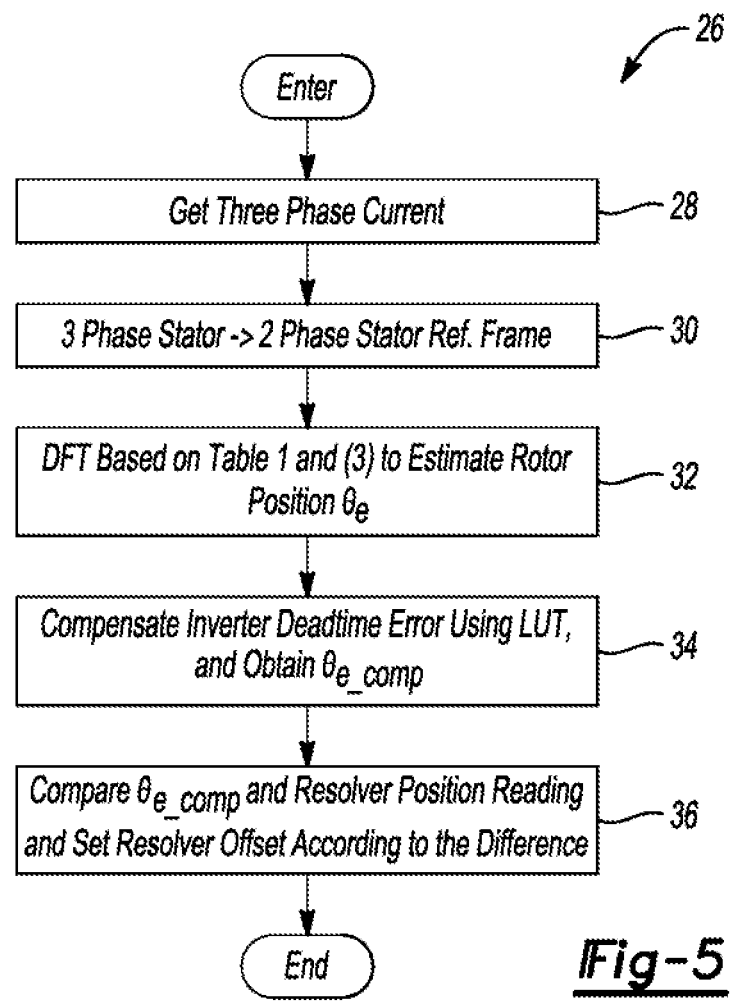
FIG. 5 is a flow chart of a detection routine.

FIG. 5 shows an algorithm 26 for a detection routine associated with the techniques proposed herein. At operation 28, the three-phase currents are obtained. The three-phase stator reference frame is transformed to the two-phase stator reference frame using standard techniques at operation 30. Rotor position $\theta_e$ is then estimated from Eqs. (3) and (4) at operation 32. At operation 34, the look-up table described above is used to compensate for the inverter deadtime error and obtain compensated rotor position, $\theta_{e\_comp}$. At operation 36, the compensated rotor position is compared with the resolver position reading, and the resolver offset is set according to the difference. The algorithm then ends.

Figure 6:
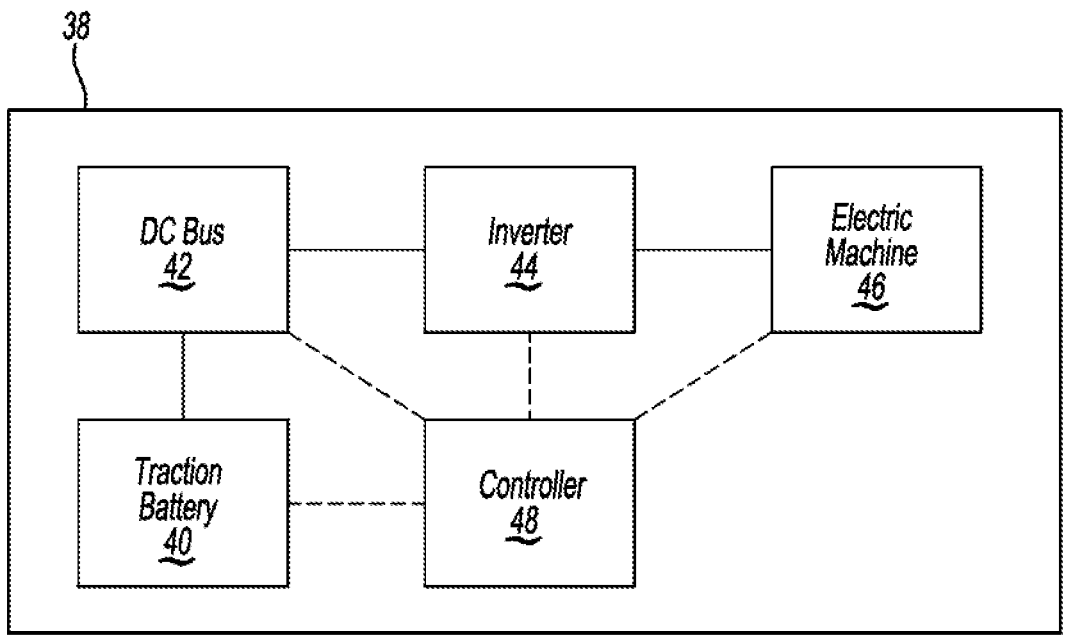
FIG. 6 is a block diagram of a vehicle.

FIG. 6 is a simplified block diagram of a vehicle 38 that includes, among other things, a traction battery 40, a DC bus 42, an inverter 44, an electric machine 46, and a controller 48. Power from the traction battery 40 can be provided to the electric machine 46 via the DC bus 42 and inverter 44 as known in the art. Power can also flow in the other direction. The controller 48 may implement the techniques contemplated herein to exercise control over the traction battery 40, inverter 44, and electric machine 46. The controller 48, for example, may operate the electric machine 46 (e.g., provide it commands to produce a specified torque or speed) based on resolver offset information derived from a current response of the electric machine 46 to AC voltage applied thereto according to the techniques contemplated herein.

Certain existing high frequency voltage injection-based resolver offset detection methods detect the resolver offset using a fixed injected voltage amplitude. The accuracy of these methods is low due to the inverter deadtime effect, and is inconsistent under different DC-bus or battery voltages. The use of a constant duty ratio high frequency voltage injection-based resolver offset detection method to mitigate inverter deadtime effects is proposed here. The magnitude of the injected high frequency voltage signal will vary with DC-bus voltage or battery voltage to maintain constant controller duty ratio output, which can achieve accurate resolver offset detection under various DC-bus voltage conditions with greater consistency, regardless of the inverter deadtime/nonlinearity effects.

The algorithms, processes, methods, logic, or strategies disclosed may be deliverable to and/or implemented by a processing device, controller, or computer, which may include any existing programmable electronic control unit or dedicated electronic control unit. Similarly, the algorithms, processes, methods, logic, or strategies may be stored as data and instructions executable by a controller or computer in many forms including, but not limited to, information permanently stored on various types of articles of manufacture that may include persistent non-writable storage media such as ROM devices, as well as information alterably stored on writeable storage media such as floppy disks, magnetic tapes, CDs, RAM devices, and other magnetic and optical media. The algorithms, processes, methods, logic, or strategies may also be implemented in a software executable object. Alternatively, they may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure and claims. As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle power system comprising:
a DC bus;
an electric machine;
an inverter electrically between the DC bus and electric machine; and
a controller programmed to command the inverter to inject AC voltage into the electric machine, and responsive to changes in DC voltage of the DC bus, alter a magnitude of the AC voltage to drive a ratio of the DC voltage to the magnitude toward a constant value as the DC voltage changes.

2. The vehicle power system of claim 1, wherein the controller is further configured to operate the electric machine according to resolver offset information derived from a current response of the electric machine to the AC voltage.

3. The vehicle power system of claim 2, wherein the resolver offset information is further derived from data contained in a look-up table.

4. The vehicle power system of claim 1, wherein a ratio of switching frequency of the inverter and injection frequency of the AC voltage is between ten and twenty.

5. The vehicle power system of claim 1, wherein the controller is further configured to inject the AC voltage with constant duty ratio.

6. The vehicle power system of claim 1 further comprising a traction battery, wherein the DC bus is electrically between the traction battery and inverter.

7. A vehicle power system comprising:
an electric machine;
an inverter; and
a controller programmed to, while injecting AC voltage output by the inverter into the electric machine as a DC voltage input to the inverter changes, drive a duty ratio of the inverter toward a constant value to obtain resolver offset information associated with the electric machine from a current response of the electric machine to the AC voltage, wherein the controller is further programmed to drive the duty ratio toward the constant value such that a ratio of the DC voltage to a magnitude of the AC voltage remains constant during the injecting.

8. The vehicle power system of claim 7, wherein a ratio of switching frequency of the inverter and injection frequency of the AC voltage is between ten and twenty.

9. The vehicle power system of claim 7, wherein the controller is further configured to command the electric machine to output a specified torque or speed according to the resolver offset information.

10. The vehicle power system of claim 9, wherein the resolver offset information is further derived from data contained in a look-up table.

11. The vehicle power system of claim 7 further comprising a traction battery or DC bus configured to provide the DC voltage.

12. A method for controlling a vehicle power system, comprising:
injecting by a controller AC voltage into an electric machine via an inverter; and
responsive to changes in DC voltage input to the inverter during the injecting, altering by the controller a magnitude of the AC voltage to drive a ratio of the DC voltage to the magnitude toward a constant value to obtain resolver offset information about the electric machine.

13. The method of claim 12, wherein a ratio of switching frequency of the inverter and a frequency of the injecting is between ten and twenty.

14. The method of claim 12, wherein the injecting is associated with constant duty ratio output.

15. The method of claim 12 further comprising commanding the electric machine to output a specified torque or speed according to the resolver offset information.

16. The method of claim 12, wherein the changes in DC voltage are associated with a traction battery or DC bus.

* * * * *